(12) United States Patent
Braught

(10) Patent No.: US 6,283,520 B1
(45) Date of Patent: Sep. 4, 2001

(54) DEVICE FOR LIFTING A WATER BOTTLE

(76) Inventor: Harvey David Braught, 139 Sleepy Hollow Rd., Ridgefield, CT (US) 06877

( * ) Notice: Subject to any disclaimer, the term of this patent is extended or adjusted under 35 U.S.C. 154(b) by 0 days.

(21) Appl. No.: 09/586,365

(22) Filed: Jun. 2, 2000

(51) Int. Cl.⁷ .............................. B65D 23/10; B65G 7/12
(52) U.S. Cl. ................................. 294/28; 294/16
(58) Field of Search .................... 294/11, 15, 16, 294/28–30, 31.1, 90, 91, 99.2, 104, 106, 113; 81/3.44

(56) References Cited

U.S. PATENT DOCUMENTS

| | | | |
|---|---|---|---|
| Re. 32,338 | * | 1/1987 | Alexander et al. ............... 294/16 |
| D. 361,934 | | 9/1995 | Croteau . |
| 1,343,548 | * | 6/1920 | Branin ................................ 294/113 |
| 1,620,272 | * | 3/1927 | May ................................... 294/28 |
| 1,637,270 | * | 7/1927 | Neely ................................. 294/90 |
| 2,001,346 | * | 5/1935 | Hays .................................. 294/28 |
| 2,610,081 | * | 9/1952 | Bushman ............................ 294/28 |
| 2,875,982 | * | 3/1959 | Unglesby ....................... 294/90 X |
| 3,727,962 | * | 4/1973 | Reisinger .......................... 294/16 |
| 4,179,954 | * | 12/1979 | Whalen ............................. 81/3.44 |
| 4,236,743 | | 12/1980 | Fox . |
| 4,768,403 | * | 9/1988 | Bar-Noy ....................... 294/28 X |
| 5,085,477 | | 2/1992 | Gagnon . |
| 5,667,265 | | 9/1997 | Gebhard . |
| 5,752,732 | | 5/1998 | Beaton et al. . |
| 5,806,904 | | 9/1998 | Smith . |

\* cited by examiner

*Primary Examiner*—Johnny D. Cherry

(57) ABSTRACT

A device for lifting a water bottle for easy lifting and transportation of a water bottle which is otherwise awkward to carry. The device for lifting a water bottle includes a pair of bars. Each of the bars is elongate and has a first end and a second end. Each of the bars has a generally planar side. The first ends of the bars are hingedly coupled together. The bars are positioned such that the planar side of the first of the bars is abuttable against the planar side of the second of the bars to define a closed position. Each of the planar sides has a depression therein. Each of the depressions is positioned generally midway between the first and second ends of the bars. The depressions each generally have a semi-circular shape. A circular bore is defined between the bars by the depressions when the bars are in the closed position. The circular bore is adapted to receive the neck of a water bottle.

17 Claims, 4 Drawing Sheets

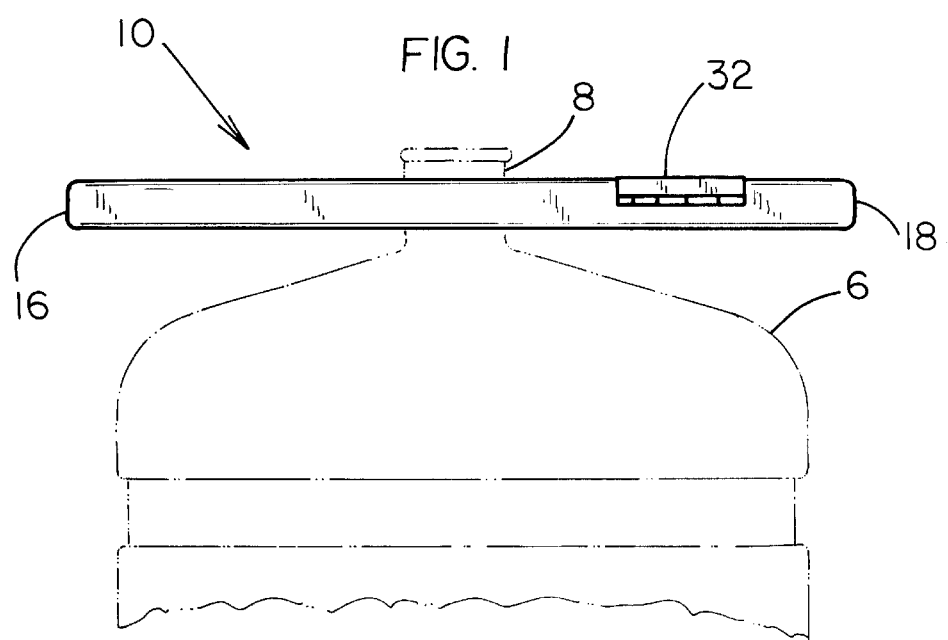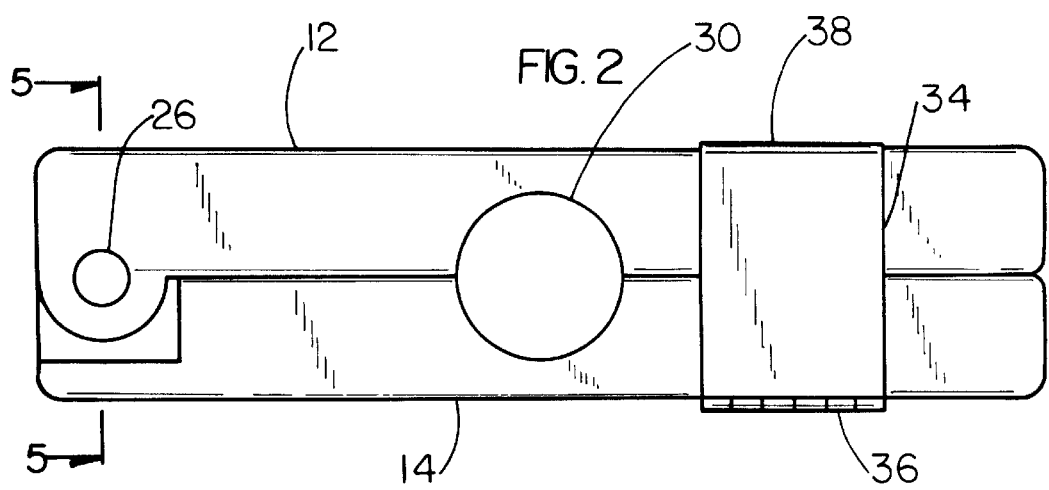

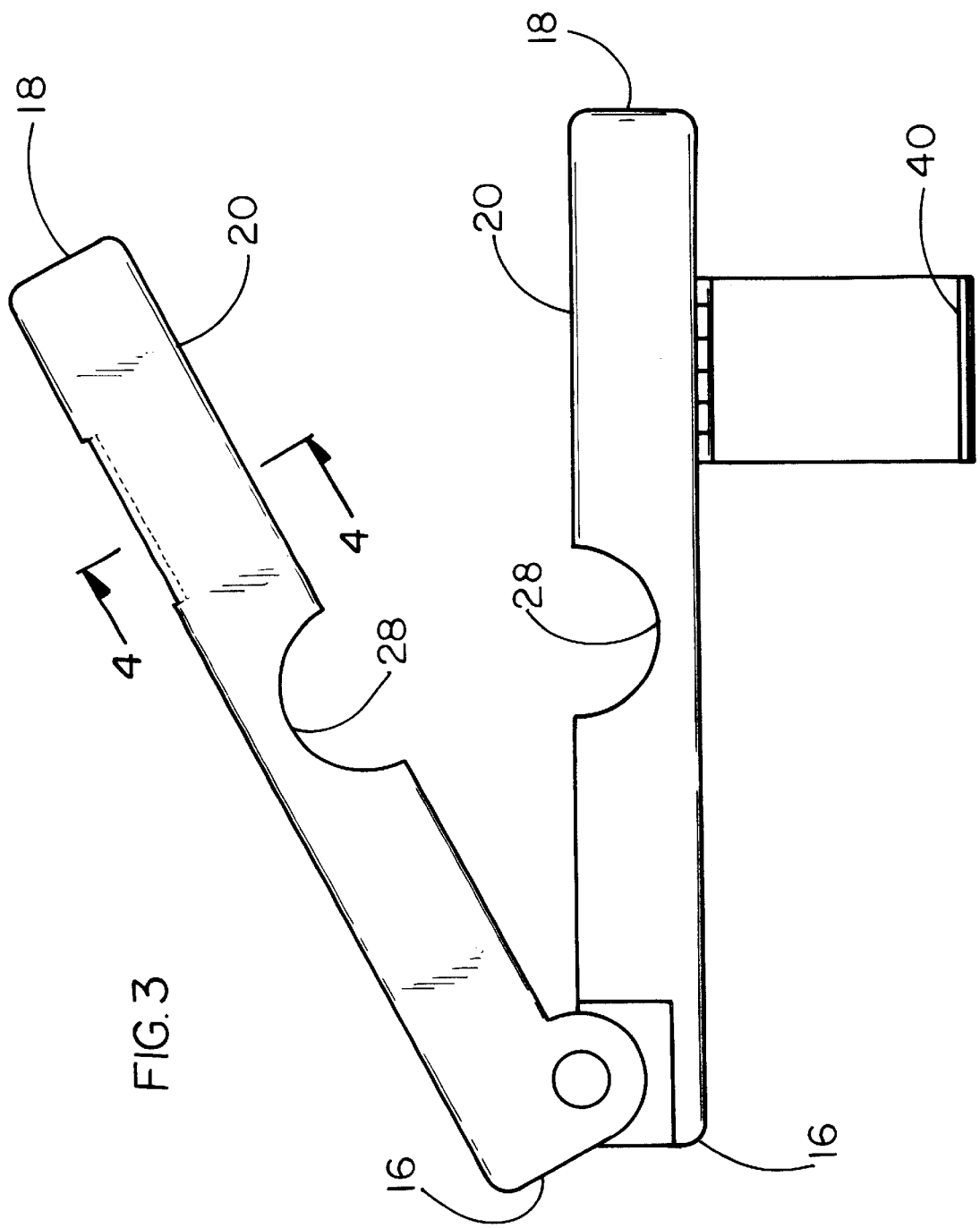

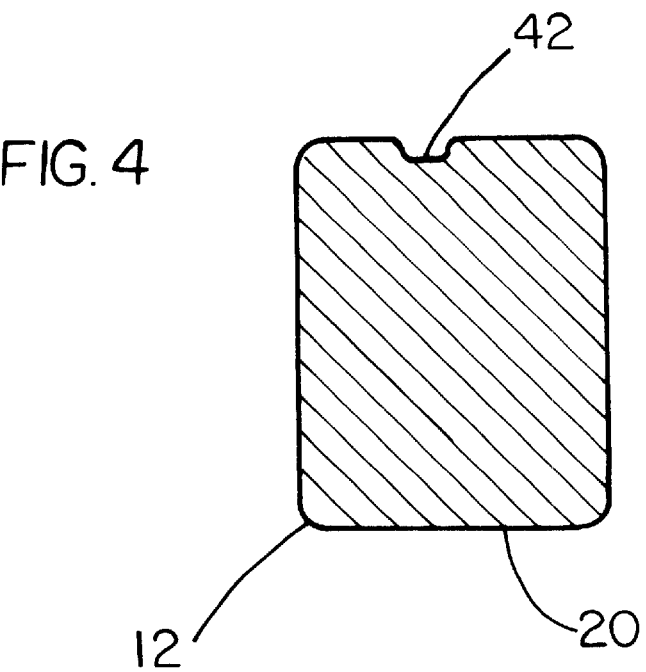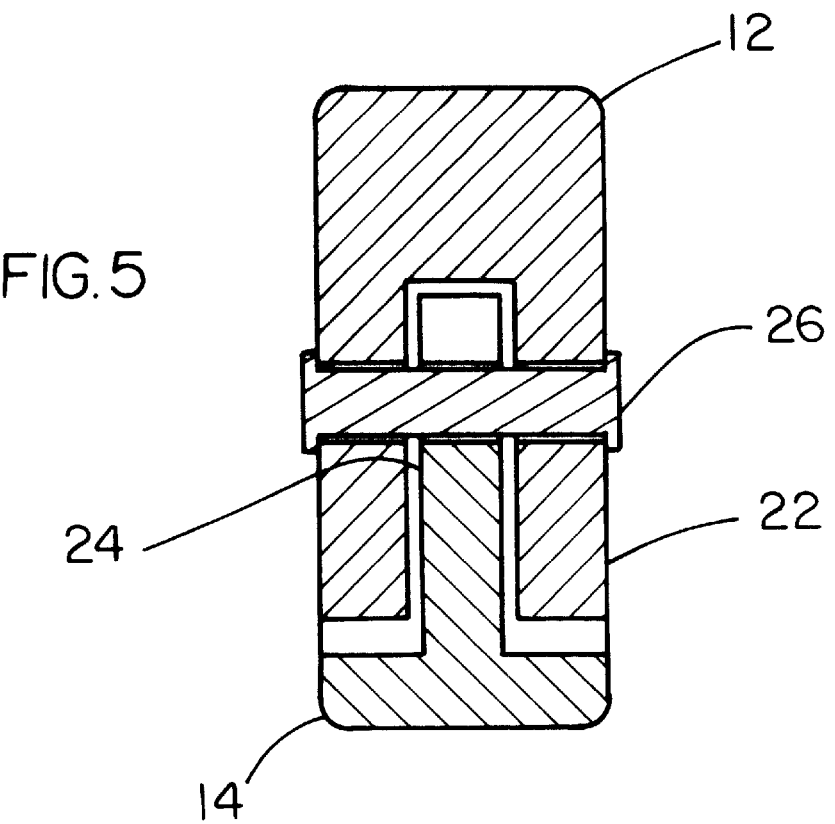

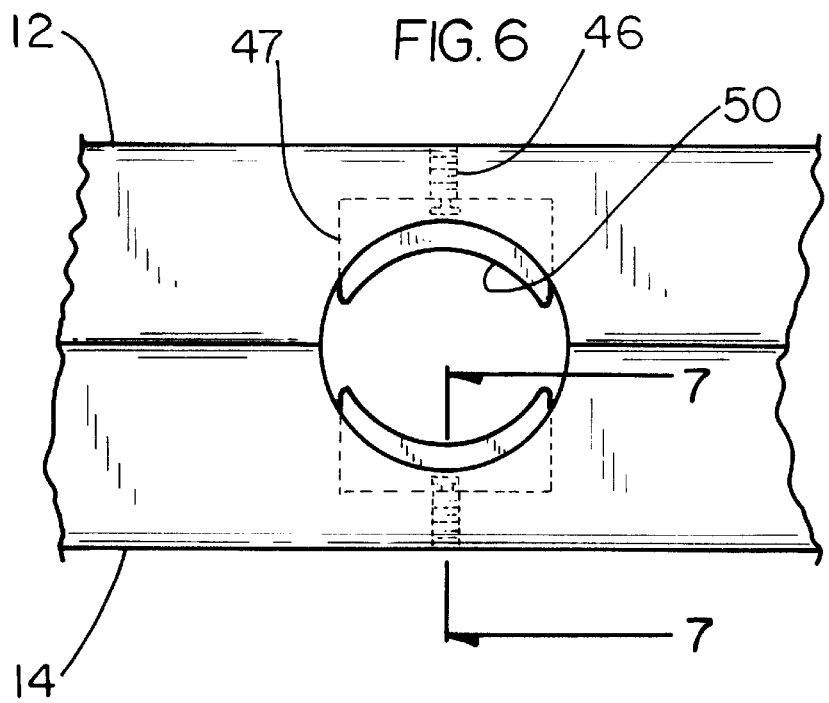
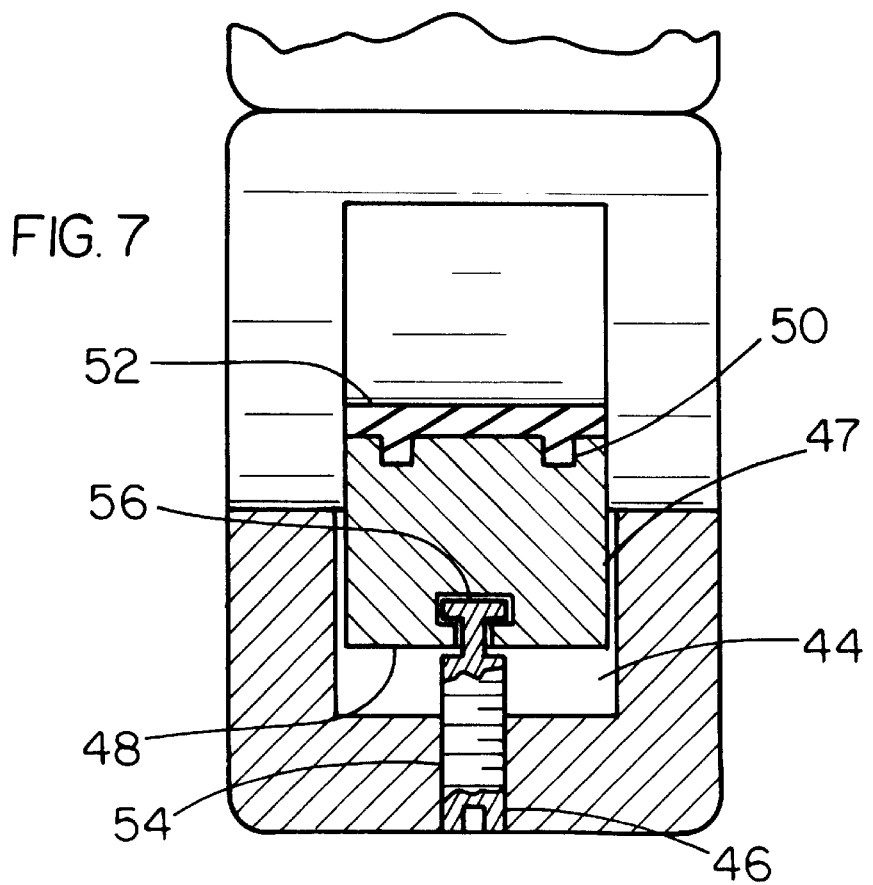

DEVICE FOR LIFTING A WATER BOTTLE

BACKGROUND OF THE INVENTION

1. Field of the Invention

The present invention relates to bottle carrying devices and more particularly pertains to a new device for lifting a water bottle for easy lifting and transportation of a water bottle which is otherwise awkward to carry.

2. Description of the Prior Art

The use of bottle carrying devices is known in the prior art. More specifically, bottle carrying devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,667,265; U.S. Pat. No. 5,085,477; U.S. Pat. No. 4,236,743; U.S. Pat. No. 5,752,732; U.S. Des. Pat. No. 361,934; and U.S. Pat. No. 5,806,904.

While these devices fulfill their respective, particular objectives and requirements, the aforementioned patents do not disclose a new device for lifting a water bottle. The inventive device includes a pair of bars. Each of the bars is elongate and has a first end and a second end. Each of the bars has a generally planar side. The first ends of the bars are hingedly coupled together. The bars are positioned such that the planar side of the first of the bars is abuttable against the planar side of the second of the bars to define a closed position. Each of the planar sides has a depression therein. Each of the depressions is positioned generally midway between the first and second ends of the bars. The depressions each generally have a semi-circular shape. A circular bore is defined between the bars by the depressions when the bars are in the closed position. The circular bore is adapted to receive the neck of a water bottle.

In these respects, the device for lifting a water bottle according to the present invention substantially departs from the conventional concepts and designs of the prior art, and in so doing provides an apparatus primarily developed for the purpose of easy lifting and transportation of a water bottle which is otherwise awkward to carry.

SUMMARY OF THE INVENTION

In view of the foregoing disadvantages inherent in the known types of bottle carrying devices now present in the prior art, the present invention provides a new device for lifting a water bottle construction wherein the same can be utilized for easy lifting and transportation of a water bottle which is otherwise awkward to carry.

The general purpose of the present invention, which will be described subsequently in greater detail, is to provide a new device for lifting a water bottle apparatus and method which has many of the advantages of the bottle carrying devices mentioned heretofore and many novel features that result in a new device for lifting a water bottle which is not anticipated, rendered obvious, suggested, or even implied by any of the prior art bottle carrying devices, either alone or in any combination thereof.

To attain this, the present invention generally comprises a pair of bars. Each of the bars is elongate and has a first end and a second end. Each of the bars has a generally planar side. The first ends of the bars are hingedly coupled together. The bars are positioned such that the planar side of the first of the bars is abuttable against the planar side of the second of the bars to define a closed position. Each of the planar sides has a depression therein. Each of the depressions is positioned generally midway between the first and second ends of the bars. The depressions each generally have a semi-circular shape. A circular bore is defined between the bars by the depressions when the bars are in the closed position. The circular bore is adapted to receive the neck of a water bottle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new device for lifting a water bottle apparatus and method which has many of the advantages of the bottle carrying devices mentioned heretofore and many novel features that result in a new device for lifting a water bottle which is not anticipated, rendered obvious, suggested, or even implied by any of the prior art bottle carrying devices, either alone or in any combination thereof.

It is another object of the present invention to provide a new device for lifting a water bottle which may be easily and efficiently manufactured and marketed.

It is a further object of the present invention to provide a new device for lifting a water bottle which is of a durable and reliable construction.

An even further object of the present invention is to provide a new device for lifting a water bottle which is susceptible of a low cost of manufacture with regard to both materials and labor, and which accordingly is then susceptible of low prices of sale to the consuming public, thereby making such device for lifting a water bottle economically available to the buying public.

Still yet another object of the present invention is to provide a new device for lifting a water bottle which provides in the apparatuses and methods of the prior art some of the advantages thereof, while simultaneously overcoming some of the disadvantages normally associated therewith.

Still another object of the present invention is to provide a new device for lifting a water bottle for easy lifting and transportation of a water bottle which is otherwise awkward to carry.

Yet another object of the present invention is to provide a new device for lifting a water bottle which includes a pair of bars. Each of the bars is elongate and has a first end and a second end. Each of the bars has a generally planar side. The first ends of the bars are hingedly coupled together. The bars are positioned such that the planar side of the first of the bars is abuttable against the planar side of the second of the bars to define a closed position. Each of the planar sides has a depression therein. Each of the depressions is positioned generally midway between the first and second ends of the bars. The depressions each generally have a semi-circular shape. A circular bore is defined between the bars by the depressions when the bars are in the closed position. The circular bore is adapted to receive the neck of a water bottle.

Still yet another object of the present invention is to provide a new device for lifting a water bottle that may be easily stored when not in use.

Even still another object of the present invention is to provide a new device for lifting a water bottle that is retrofittable to varying sizes of water bottles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side in-use view of a new device for lifting a water bottle according to the present invention.

FIG. 2 is a schematic top view of the present invention.

FIG. 3 is a schematic top view of the present invention.

FIG. 4 is a schematic side cross-sectional view taken along line 4—4 of FIG. 3.

FIG. 5 is a schematic side cross-sectional view taken along line 5—5 of FIG. 2.

FIG. 6 is a schematic top view of the second embodiment of the present invention.

FIG. 7 is a schematic cross-sectional view taken along line 7—7 of FIG. 6.

DESCRIPTION OF THE PREFERRED EMBODIMENT

With reference now to the drawings, and in particular to FIGS. 1 through 6 thereof, a new device for lifting a water bottle embodying the principles and concepts of the present invention and generally designated by the reference numeral 10 will be described.

As best illustrated in FIGS. 1 through 7, the device for lifting a water bottle 10 generally comprises a pair of bars 12, 14. Each of the bars 12, 14 is elongate and has a first end 16 and a second end 18. Each of the bars 12, 14 has a generally planar side 20. The first ends 16 of the bars 12, 14 are hingedly coupled together. FIGS. 2 and 5 depict a hinge where one of the bars has a female protruding member 22 and the other has a male protruding member 24. The female member 22 is placed in the male member 24 and a rivet 26 is extended through both to pivotally connect the two. The female and male members extend away from the bars 12, 14 at substantially perpendicular angles. The bars 12, 14 are positioned such that the planar side 20 of the first 12 of the bars is abuttable against the planar side 20 of the second 14 of the bars to define a closed position. Each of the planar sides 20 has a depression 28 therein. Each of the depressions 28 is positioned generally midway between the first 16 and second ends 18 of the bars. Each of the depressions 28 generally has a semi-circular shape. A circular bore 30 is defined between the bars 12, 14 by the depressions 28 when the bars 12, 14 are in the closed position. In the preferred embodiment the circular bore 30 has a diameter substantially equal to the size of the neck 8 of a standard five-gallon water bottle 6. Ideally, each of the bars 12, 14 has a length substantially equal to twelve inches, a height substantially equal to ¾ inches and a width substantially equal to 2½ inches.

A coupling means 32 removably couples the first bar 12 to the second bar 14 in the closed position. The coupling means includes a panel 34 having a distal edge 36 and a proximal edge 38. The panel 34 is substantially planar. The distal edge 36 is hingedly coupled to the second bar 14, and the panel 34 is located generally between the second end 18 of the second bar 14 and the depression 28 in the second bar 14. The panel 34 is positioned such that the panel may transverse the first 12 and second bar 14 when the bars are in the closed position. The panel 34 is able to pivot in a direction orientated substantially perpendicular to a longitudinal axis of the second bar 14. FIG. 4 shows the distal end 36 of the panel 34 being angled perpendicular to the plane of the panel and hingedly coupled to a side of the second bar 14 opposite of the planar side 20 of the second bar 14 having the depression 28 therein. The proximal edge 38 of the panel 34 has a lip 40 thereon.

The first bar 12 has an indentation 42 therein. The indentation 42 is positioned and adapted to removably receive the lip 40 on the panel 34 to define a locked position. The indentation 42 is preferably located on a side of the first bar 12 opposite the planar side 20 of the first bar 12 having the depression 28 therein.

In the second embodiment, shown in FIGS. 6 and 7, a gripping means grips the neck of the bottle. Each of the depressions 28 in the bars 12, 14 has a slot 44 extending therein, and each of the bars 12, 14 has an opening 46 extending between the slot 44 and an opposite side of the bars 12, 14 with respect to the planar sides 20. A pair of blocks 47 each has a planar back side 48 and an arced front side 50. Each of the blocks 47 is slidably mounted in one of the slots 44 such that the back sides 48 are directed away from the depression 28. Each of the blocks 47 is positioned such that the arced front sides 50 face each other when the bars 12, 14 are in a closed position. Each of the front sides 50 has a gripping material 52 thereon. The gripping material 52 is preferably an elastomeric material.

A pair of biasing means selectively biases the blocks 47 toward and away from the depressions 28. Each of the biasing means comprises a shaft 54 having a first end 56 rotatably coupled to one of the back sides 48 of the blocks 47. Each of the shafts 54 extends through one of the openings 46. The shafts 54 have a threaded peripheral wall for gripping a surface of the openings 46, and may be conventional screws having a swivel end for rotatably coupling to the blocks 47.

In use, the first 12 and second 14 bars are closed around the neck 8 of a water bottle 6 such that the neck 8 of the water bottle is placed between the depressions 28. The neck 8 is thinner than the mouth of the water bottle 6 so that the ends 16, 18 of the bars may be lifted up to lift up the water bottle 6. The coupling means 32 aids in keeping the first bar 12 abutted against the second bar 14. The second embodiment may be used for varying sized bottles, wherein the blocks 47 are positioned with the biasing means 46 so that the arced surfaces 50 are abutted against the neck 8 of the water bottle 6 when the bars 12, 14 are in a closed position as depicted in FIG. 6.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A removable handle device for water bottles, said device being removably couplable to a neck of a water bottle, said device comprising:

a pair of bars, each of said bars being elongate and having a first end and a second end, each of said bars having a generally planar side, said first ends of said bars being hingedly coupled together, said bars being positioned such that said planar side of the first of said bars is abuttable against said planar side of the second of said bars to define a closed position, each of said planar sides having a depression therein, each of said depressions being positioned generally midway between said first and second ends of said bars, each of said depressions generally having a semi-circular shape, wherein a circular bore is defined between said bars by said depressions when said bars are in said closed position;

each of said depressions in said bars having a slot extending therein, each of said bars having an opening extending between said slot and an opposite side of said bars with respect to said planar sides;

a gripping means for gripping the neck of the bottle, said gripping means comprising:

a pair of blocks, each of said blocks having a planar back side and an arced front side, each of said blocks being slidably mounted in one of said slots such that said back sides are directed away from said depression, each of said blocks being positioned such that said arced front sides face each other when said bars are in a closed position; and a pair of biasing means for selectively biasing said blocks toward and away from said depressions.

2. The removable handle device as in claim 1, wherein each of said biasing means further comprises:

a shaft having a first end rotatably coupled to one of said back sides of said blocks, each of said shafts extending through one of said openings, each of said shafts having a threaded peripheral wall for gripping a surface of said openings.

3. The removable handle device as in claim 1, further comprising:

a coupling means for removably coupling said first bar to said second bar in said closed position.

4. The removable handle device as in claim 3, wherein said coupling means comprises:

a panel, said panel having a distal edge and a proximal edge, said panel being substantially planar, said distal edge being hingedly coupled to said second bar, said panel being located generally between said second end of said second bar and said depression in said second bar, said panel being positioned such that said panel may transverse said first and second bars when said bars are in said closed position, said panel being able to pivot in a direction orientated substantially perpendicular to a longitudinal axis of said second bar, said proximal edge of said panel having a lip thereon; and said first bar having an indentation therein, said indentation being positioned and adapted to removably receive said lip on said panel to define a locked position.

5. The removable handle device as in claim 1, further comprising:

a coupling means for removably coupling said first bar to said second bar in said closed position.

6. The removable handle device as in claim 5, wherein said coupling means comprises:

a panel, said panel having a distal edge and a proximal edge, said panel being substantially planar, said distal edge being hingedly coupled to said second bar, said panel being located generally between said second end of said second bar and said depression in said second bar, said panel being positioned such that said panel may transverse said first and second bars when said bars are in said closed position, said panel being able to pivot in a direction orientated substantially perpendicular to a longitudinal axis of said second bar, said proximal edge of said panel having a lip thereon; and said first bar having an indentation therein, said indentation being positioned and adapted to removably receive said lip on said panel to define a locked position.

7. A removable handle device for water bottles, said device being removably couplable to a neck of a water bottle, said device comprising:

a pair of bars, each of said bars being elongate and having a first end and a second end, each of said bars having a generally planar side, said first ends of said bars being hingedly coupled together, said bars being positioned such that said planar side of the first of said bars is abuttable against said planar side of the second of said bars to define a closed position, each of said planar sides having a depression therein, each of said depressions being positioned generally midway between said first and second ends of said bars, each of said depressions generally having a semi-circular shape, wherein a circular bore is defined between said bars by said depressions when said bars are in said closed position;

a coupling means for removably coupling said first bar to said second bar in said closed position;

wherein said coupling means comprises a panel, said panel having a distal edge and a proximal edge, said panel being substantially planar, said distal edge being hingedly coupled to said second bar, said panel being located generally between said second end of said second bar and said depression in said second bar, said panel being positioned such that said panel may transverse said first and second bar when said bars are in said closed position, said panel being able to pivot in a direction orientated substantially perpendicular to a longitudinal axis of said second bar, said proximal edge of said panel having a lip thereon; and said first bar having an indentation therein, said indentation being positioned and adapted to removably receive said lip on said panel to define a locked position.

8. The removable handle device as in claim 7, wherein each of said depressions in said bars has a slot extending therein, each of said bars having an opening extending between said slot and an opposite side of said bars with respect to said planar sides; and further comprising:

a gripping means for gripping the neck of the bottle, said gripping means comprising:
   a pair of blocks, each of said blocks having a planar back side and an arcuate front side, each of said blocks being slidably mounted in one of said slots such that said back sides are directed away from said depression, each of said blocks being positioned such that said arcuate front sides face each the other when said bars are in a closed position; and
   a pair of biasing means for selectively biasing said blocks toward and away from said depressions.

9. The removable handle device as in claim 8, wherein each of said biasing means further comprises a shaft having a first end rotatably coupled to one of said back sides of said blocks, each of said shafts extending through one of said openings, each of said shafts having a threaded peripheral wall for gripping a surface of said openings.

10. The removable handle device as in claim 8, further comprising a coupling means for removably coupling said first bar to said second bar in said closed position.

11. The removable handle device as in claim 10, wherein said coupling means comprises:

a panel having a distal edge and a proximal edge, said panel being substantially planar, said distal edge being hingedly coupled to said second bar, said panel being located generally between said second end of said second bar and said depression in said second bar, said panel being positioned such that said panel may transverse said first and second bars when said bars are in said closed position, said panel being able to pivot in a direction orientated substantially perpendicular to a longitudinal axis of said second bar, said proximal edge of said panel having a lip thereon; and wherein said first bar has an indentation therein, said indentation being positioned and adapted to removably receive said lip on said panel to define a locked position.

12. A removable handle device for water bottles, said device being removably couplable to a neck of a water bottle, said device comprising:

a pair of bars, each of said bars being elongate and having a first end and a second end, each of said bars having an opposing side, said first ends of said bars being hingedly coupled together, said bars being positioned such that said opposing side of the first of said bars is generally abuttable against said opposing side of the second of said bars to define a closed position, each of said opposing sides having a depression therein, each of said depressions being positioned on said bars in a generally opposed condition when said bars are in said closed position, each of said depressions having a generally semi-circular shape such that a generally circular bore is defined between said bars by said depressions when said bars are in said closed position;

each of said depressions in said bars having a slot extending therein, each of said bars having an opening extending between said slot and an opposite side of said bars with respect to said opposing sides;

a gripping means for gripping the neck of the bottle, said gripping means comprising:
   a pair of blocks, each of said blocks having a back side and an arcuate front side, each of said blocks being slidably mounted in one of said slots such that said arcuate front sides face each other when said bars are in a closed position; and
   a pair of adjusting means for selectively adjusting positions of each of said blocks toward and away from each other in said depressions.

13. The removable handle device as in claim 12, wherein each of said adjusting means further comprises a shaft having a first end rotatably coupled to one of said back sides of said blocks, each of said shafts extending through one of said openings, each of said shafts having a threaded peripheral wall for gripping a surface of said openings.

14. The removable handle device as in claim 13, further comprising a coupling means for removably coupling said first bar to said second bar in said closed position.

15. The removable handle device as in claim 14, wherein said coupling means comprises a panel having a distal edge and a proximal edge, said panel being substantially planar, said distal edge being hingedly coupled to said second bar, said panel being located generally between said second end of said second bar and said depression in said second bar, said panel being positioned such that said panel may transverse said first and second bars when said bars are in said closed position, said panel being able to pivot in a direction orientated substantially perpendicular to a longitudinal axis of said second bar, said proximal edge of said panel having a lip thereon; and wherein said first bar having an indentation therein, said indentation being positioned and adapted to removably receive said lip on said panel to define a locked position.

16. The removable handle device as in claim 12, further comprising a coupling means for removably coupling said first bar to said second bar in said closed position.

17. The removable handle device as in claim 16, wherein said coupling means comprises a panel having a distal edge and a proximal edge, said panel being substantially planar, said distal edge being hingedly coupled to said second bar, said panel being located generally between said second end of said second bar and said depression in said second bar, said panel being positioned such that said panel may transverse said first and second bars when said bars are in said closed position, said panel being able to pivot in a direction orientated substantially perpendicular to a longitudinal axis of said second bar, said proximal edge of said panel having a lip thereon; and wherein said first bar has an indentation therein, said indentation being positioned and adapted to removably receive said lip on said panel to define a locked position.

* * * * *